US011939793B2

(12) United States Patent
Amuduri et al.

(10) Patent No.: US 11,939,793 B2
(45) Date of Patent: Mar. 26, 2024

(54) LOCK ACTUATION CONTROL

(71) Applicant: Carrier Corporation, Palm Beach Gardens, FL (US)

(72) Inventors: Santhosh Amuduri, Telengana (IN); Srinivasa Rao Veeravalli, Telengana (IN); Subhash Reddy Gopavaram, Telengana (IN); Vikas Kumar, Telengana (IN)

( * ) Notice: Subject to any disclaimer, the term of this patent is extended or adjusted under 35 U.S.C. 154(b) by 0 days.

(21) Appl. No.: 17/248,086

(22) Filed: Jan. 8, 2021

(65) Prior Publication Data

US 2021/0214968 A1 Jul. 15, 2021

(51) Int. Cl.
*E05B 17/22* (2006.01)
*E05B 47/00* (2006.01)

(52) U.S. Cl.
CPC .............. *E05B 17/22* (2013.01); *E05B 47/00* (2013.01); *E05B 2047/0067* (2013.01)

(58) Field of Classification Search
CPC ... E05B 17/22; E05B 47/00; E05B 2047/0067
See application file for complete search history.

(56) References Cited

U.S. PATENT DOCUMENTS 7,486,188 B2 * 2/2009 Van Alstyne ........ G06Q 10/087 340/505
9,145,728 B1 9/2015 LeBlanc
9,317,987 B2 * 4/2016 Cleveland ............... G06F 21/86
10,072,454 B1 * 9/2018 Roosli ....................... E05G 1/02
10,347,115 B1 * 7/2019 Mukundala ............ G08B 25/10
2011/0175730 A1 * 7/2011 Stevenson .......... G07C 9/00912 340/5.73
2011/0279225 A1 * 11/2011 Frontino ................ G07D 11/30 340/5.3
2014/0055276 A1 * 2/2014 Logan ...................... H04Q 9/00 340/686.6
2014/0305352 A1 * 10/2014 Dowling ................. G07F 9/009 109/38
2014/0354398 A1 12/2014 Boday et al.
2015/0320209 A1 * 11/2015 Hasselback ............... E05G 1/04 312/227
2016/0037916 A1 * 2/2016 Hermann ............ E05B 65/0014 312/209
2016/0053526 A1 * 2/2016 Dittrich ................... E05G 1/026 109/38
2016/0080705 A1 * 3/2016 Jain ......................... F25D 29/00 348/152
2016/0147977 A1 * 5/2016 Adams .................... G07F 9/001 700/232

* cited by examiner

*Primary Examiner* — Mark A Williams

(57) ABSTRACT

A safe including a lock actuator and a control system communicatively connected with the lock actuator, and a method for controlling a lock actuator of a safe are provided. The lock actuator is configured to lock or unlock a mechanical or electronic lock of the safe. The control system includes a transmitter, a receiver, and a processor. The transmitter is configured to emit light (ex. infrared light) into the safe. The receiver is configured to receive light, for example, the same infrared wave, emitted from the transmitter and generate an output signal. The processor is configured to receive the output signal from the receiver and determine whether item is inside the safe. The control system disables the lock actuator from locking the safe when the output signal indicates no item is inside the safe.

14 Claims, 4 Drawing Sheets

LOCK ACTUATION CONTROL

CROSS REFERENCE TO A RELATED APPLICATION

The application claims the benefit of India Provisional Application No. 202011001703 filed Jan. 14, 2020, the contents of which are hereby incorporated in their entirety.

BACKGROUND

Existing safes, such as, for example, in hotel rooms, offer the ability to safely store personal belongings for a temporary period of time. This temporary period of time typically corresponds with the amount of time a guest stays in the hotel room. Various safes allow the hotel guest to lock the safe using a unique personal identification number (PIN), biometrics, RFID, magnetic card, etc. when electronic locks are used by the safe, or with a key when mechanical locks are used by the safe. For electronically locking safes, when the safe is unlocked, the safe typically clears the password (ex. PIN, biometric identifier, RFID, magnetic card, etc.).

However, problems arise when the hotel guest checks out and the safe is left in a locked state. When the safe is left in a locked state the next hotel guest is prevented from using the safe. The leaving of the safe in a locked state, in certain instances, is done on accident by the previous guest where the previous guest may have forgotten that they locked the safe with one or more item inside. In other instances however, the safe is left in a locked state deliberately by the previous guest with nothing inside the safe. In either case, when the safe is left in a locked state, the hotel staff has to come to the room and open the safe for the next guest. This can be a very cumbersome process to the operation of the hotel.

Accordingly, there remains a need for a safe and method of controlling the safe that reduces the likelihood of the safe being left in a locked state between hotel guests.

BRIEF DESCRIPTION

According to one embodiment a safe with a lock actuator and a control system is provided. The lock actuator is configured to lock or unlock a mechanical or electronic lock of the safe. The control system is communicatively connected with the lock actuator. The control system includes a transmitter, a receiver, and a processor. The transmitter is configured to emit a light into the safe. The receiver is configured to receive the light emitted from the transmitter and generate an output signal. The processor is configured to receive the output signal from the receiver and determine whether an item is inside the safe.

In accordance with additional or alternative embodiments, the light is an infrared light.

In accordance with additional or alternative embodiments, the light is emitted from the transmitter when a user attempts to lock the mechanical or electronic lock of the safe.

In accordance with additional or alternative embodiments, when the receiver receives the light emitted from the transmitter the output signal indicates no item is inside the safe.

In accordance with additional or alternative embodiments, the processor disables the lock actuator from locking the safe when the output signal indicates no item is inside the safe.

In accordance with additional or alternative embodiments, when the receiver does not receive the light emitted from the transmitter the output signal indicates an item is inside the safe.

In accordance with additional or alternative embodiments, the processor enables the lock actuator to lock the safe when the output signal indicates an item is inside the safe.

In accordance with additional or alternative embodiments, the control system further includes at least one reflector configured to reflect the light emitted from the transmitter toward the receiver.

In accordance with additional or alternative embodiments, at least one reflector is located on a lower surface of the safe on approximately the same horizontal plane as the lower surface of the safe.

In accordance with additional or alternative embodiments, the safe is configured to transmit a notification to at least one of a mobile device and a room management system.

In accordance with additional or alternative embodiments, the notification is transmitted using Bluetooth.

In accordance with additional or alternative embodiments, the notification indicates that an item is inside the safe.

In accordance with additional or alternative embodiments, the safe transmits the notification to at least one of the mobile device and the room management system when a current time is within a selected time period of a checkout time.

In accordance with additional or alternative embodiments, the selected time period is one hour prior to the checkout time.

According to another aspect of the disclosure a method for controlling a lock actuator of a safe is provided. The method provides for the emitting, from a transmitter, a light into a safe toward a receiver, the receiver configured to receive the light and generate an output signal, receiving, from a receiver at a processor, the output signal generated by the receiver, and determining, in the processor, whether an item is inside the safe.

In accordance with additional or alternative embodiments, the light is an infrared light.

In accordance with additional or alternative embodiments, the light is emitted from the transmitter when a user attempts to lock a mechanical or electronic lock of the safe.

In accordance with additional or alternative embodiments, the output signal indicates no item is inside the safe when the receiver receives the light emitted from the transmitter.

In accordance with additional or alternative embodiments, the lock actuator is disabled from locking a mechanical or electronic lock of the safe when the output signal indicates no item is inside the safe.

In accordance with additional or alternative embodiments, the output signal indicates an item is inside the safe when the receiver does not receive the light emitted from the transmitter.

In accordance with additional or alternative embodiments, the lock actuator is enabled to lock a mechanical or electronic lock of the safe when the output signal indicates an item is inside the safe.

In accordance with additional or alternative embodiments, the method further includes determining, in a room management system, whether a current time is within a selected time period of a checkout time.

In accordance with additional or alternative embodiments, the method further includes transmitting a notification from the safe to at least one of a mobile device and the room management system when the output signal indicates an item is inside the safe and the current time is within the selected time period of the checkout time.

In accordance with additional or alternative embodiments, the selected time period is one hour prior to the checkout time.

In accordance with additional or alternative embodiments, the notification is transmitted using Bluetooth.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

A safe and method of controlling a lock actuator of a safe are provided. The safe and method for controlling the lock actuator of a safe, in certain instances, help to reduce the likelihood that the safe will be left in a locked state between hotel guests. The safe and method of controlling a lock actuator of a safe are configured to prevent the safe from being locked when there are no items inside the safe. By preventing the safe from being locked when no items are inside the safe, the safe helps to ensure that next guest is capable of using the safe without having to involve the hotel staff.

Figure 1:
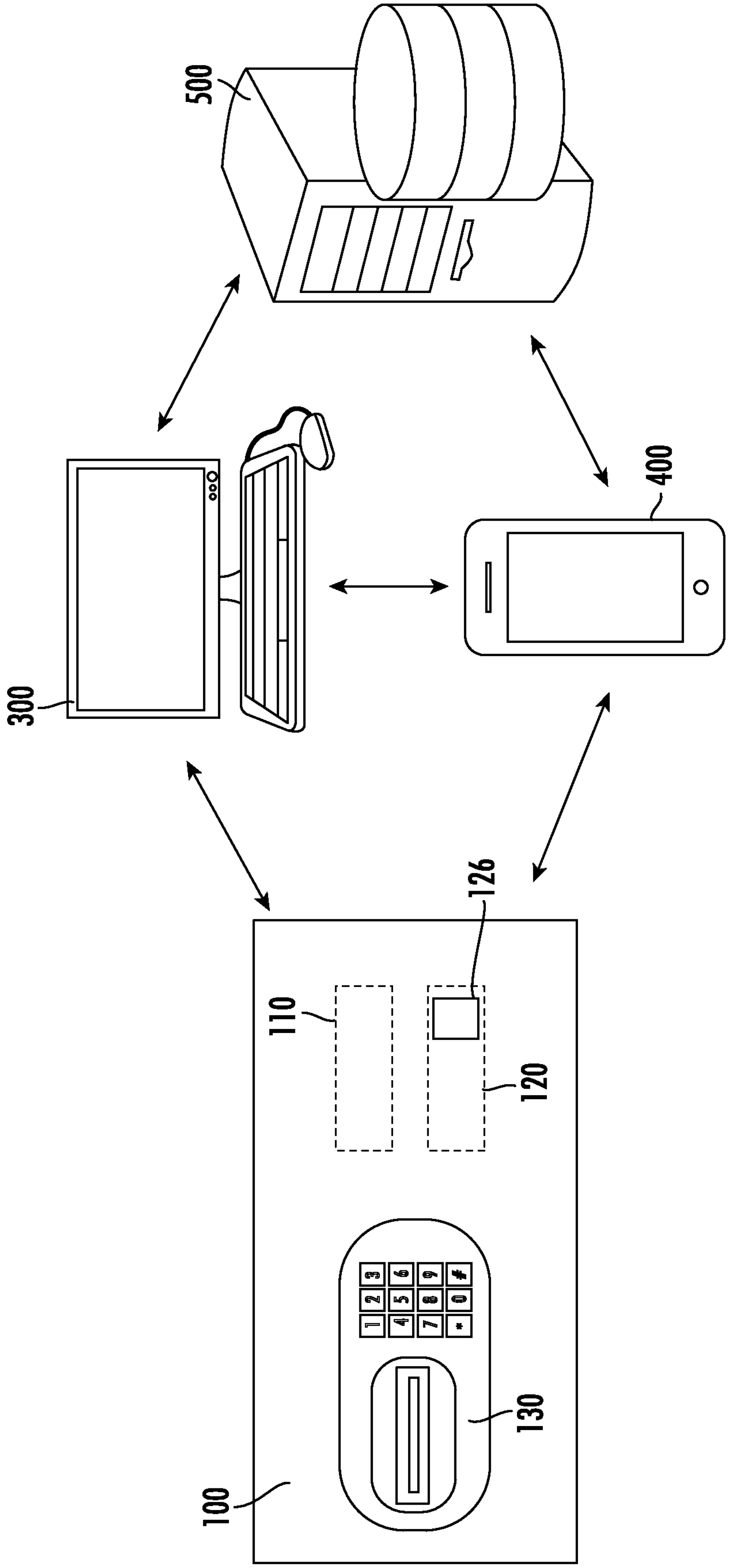
FIG. 1 is a schematic illustration of a safe, mobile device, room management system, and server, in accordance with one aspect of the disclosure.
Figure 2:
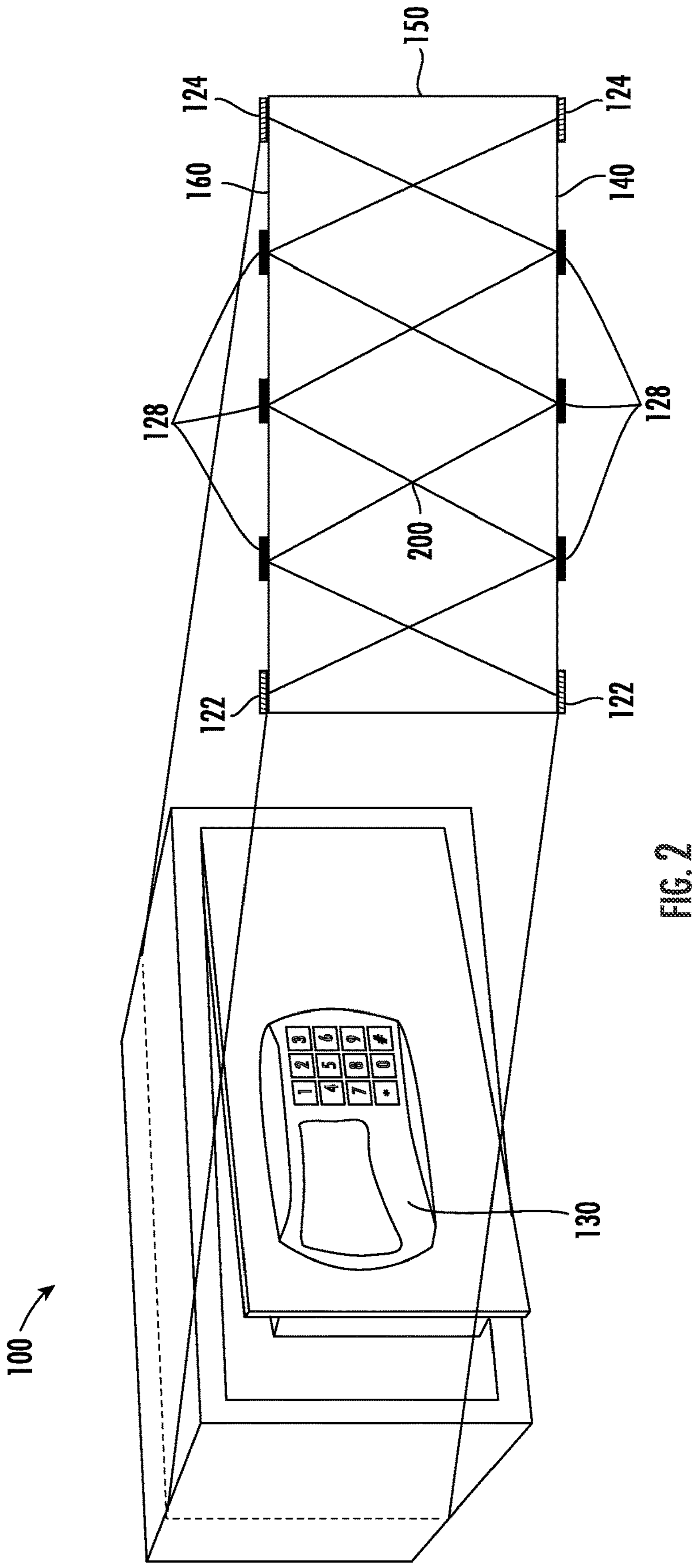
FIG. 2 is a perspective cross-sectional view of a safe, in accordance with one aspect of the disclosure.
Figure 3:
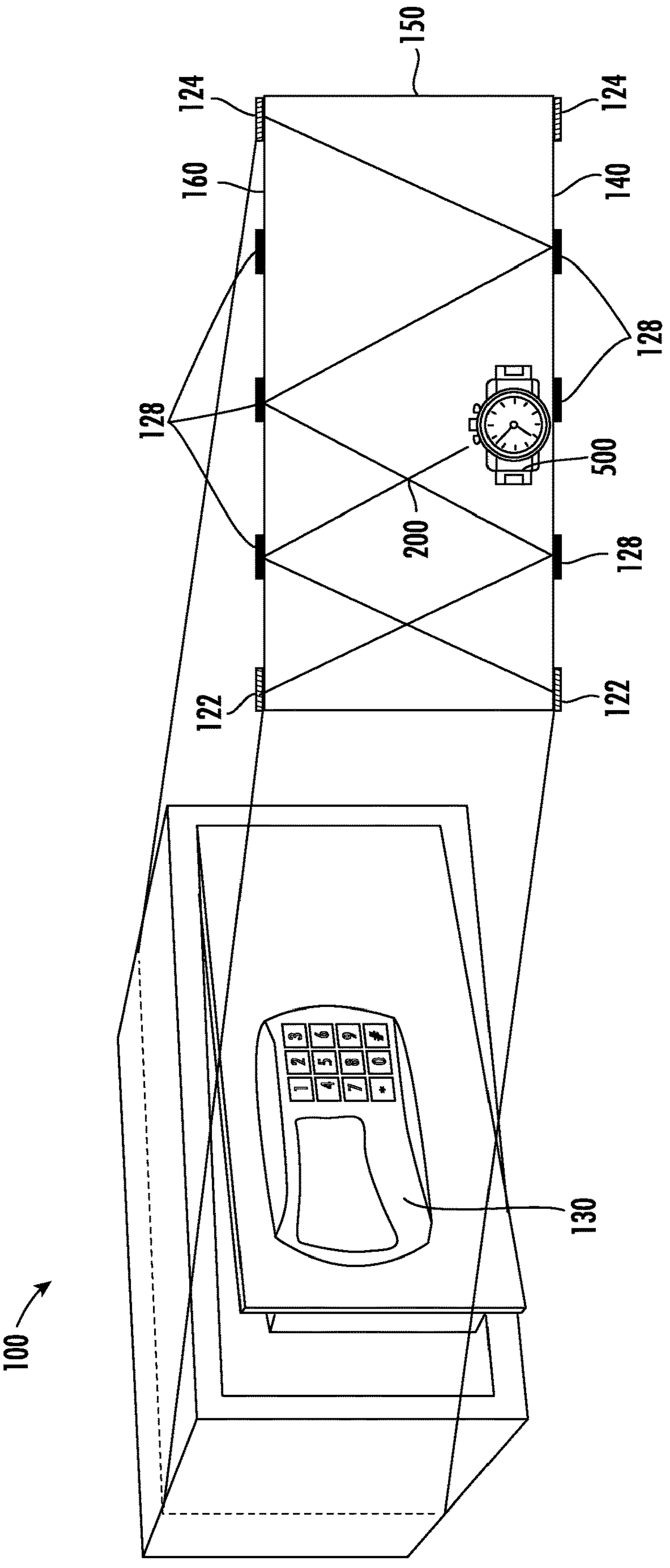
FIG. 3 is a perspective cross-sectional view of a safe with an item inside the safe, in accordance with one aspect of the disclosure.

With reference now to the Figures, a schematic illustration of a safe, mobile device, room management system, and server, in accordance with various aspects of the disclosure, is shown in FIG. 1. As shown in FIG. 1, the safe 100 includes a lock actuator 110 and a control system 120. The lock actuator 110 is configured to lock or unlock a mechanical or electronic lock 130 of the safe 100. The control system 120 is communicatively connected with the lock actuator 110. As shown in FIGS. 2 and 3, the control system 120 includes a transmitter 122 and a receiver 124. The transmitter 122, in certain instances, may be any suitable light emitted diode (LED) capable of emitting a light 200, for example, an infrared light, into a safe 100.

The processor 126 of the control system 120 is shown in FIG. 1. The processor 126, in certain instances, may be on a printed circuit board (PCB) which mechanically supports and communicatively connects components using conductive tracks, pads, or other features etched from one or more layers of copper onto and/or between one or more non-conductive sheets. The transmitter 122, in certain instances, emits the light 200, when instructed by the processor 126. The receiver 124 is configured to receive the light 200, for example, the same infrared wave, emitted from the transmitter 122 and generate an output signal (not shown). In certain instances, the receiver 124 transmits an output signal to the processor 126 indicating that the light 200 was received. In certain instances, the receiver transmits an output signal to the processor 126 indicating that no light was received. The processor 126 is configured to receive the output signal from the receiver 124 and determine whether an item 500 is inside the safe 100. In certain instances, the processor 126 determines whether an item 500 is inside the safe 100 based on whether or not the receiver 124 receives the light 200 from the transmitter 122.

The light 200 being emitted by the transmitter 122, in certain instances, is an infrared light. In certain instances, the transmitter 122 is capable emitting any light in the visible spectrum (ex. infrared light). The light 200, in certain instances, is emitted from the transmitter 122 when a user (not shown) attempts to lock the mechanical or electronic lock 130 of the safe 100. For example, when a user attempts to lock the safe 100, the processor 126, in certain instances, instructs the transmitter 122 to emit the light 200. The user may attempt to lock the safe 100, for example, using a unique personal identification number (PIN), biometrics, RFID, magnetic card, etc. when incorporating an electronic lock, or with a key when incorporating a mechanical lock. Regardless of which type of lock is utilized by the safe 100, in certain instances, the processor 126 is configured to instruct the transmitter 122 to emit the light 200, when an attempt to lock the safe 100 is made by the user. The light 200, in certain instances, is emitted from the transmitter 122 just before a selected time period of a checkout time. For example, the processor 126, in certain instances, may instruct the transmitter 122 to emit the light 200 just before the selected time period of a checkout time.

As shown in FIG. 2, in certain instances, when the receiver 124 receives the light 200 emitted from the transmitter 122 the output signal, generated by the receiver 124 being received by the processor 126, indicates no item is inside the safe 100. The light 200, in certain instances, is capable of being received by the receiver 124 due to an absence of an item 500, which, when present, would block the light 200 from reaching the receiver 124. When the output signal indicates that no item is inside the safe 100, in certain instances, the processor 126 disables the lock actuator 110 from locking the safe 100.

As shown in FIG. 3, in certain instances, when the receiver 124 does not receive the light 200 emitted from the transmitter 122 the output signal, generated by the receiver 124 being received by the processor 126, indicates an item 500 is inside the safe 100. The light 200, in certain instances, is not capable of being received by the receiver 124 due to the presence of an item 500 blocking the light 200 from reaching the receiver 124. When the output signal indicates that an item 500 is inside the safe 100, in certain instances, the processor 126 enables the lock actuator 110 to lock the safe 100.

The safe 100, in certain instances, includes at least one reflector 128 configured to reflect the light 200 emitted from the transmitter 122 toward the receiver 124. In certain instances, the safe 100 includes multiple transmitters 122, multiple receivers 124, and/or multiple reflectors 128. In certain instances, when multiple transmitters 122 are utilized by the safe 100, all transmitters 122 emit a light 200 simultaneously. In certain instances, when multiple transmitters 122 are utilized by the safe 100, the transmitters 122 emit light 200 at different intervals, for example, one transmitter 122 may emit light 200 at a different time than another transmitter 122. An increased number of transmitters 122, receivers 124, and/or reflectors 128 may, in certain instances, increase the resolution of detecting an item 500. These transmitters 122, receivers 124, and reflectors 128, in certain instances, are configured at various points on the interior of the safe 100 so that the light 200 is capable of coming in contact with an item 500 if an item 500 is present inside the safe 100. For example, the lower surface 140 of the safe 100, upper surface 160 of the safe, and each respective sidewall 150 of the safe 100 may include one or more transmitter 122, receiver 124, and/or reflector 128 to detect if an item 500 is inside the safe 100.

In certain instances, at least one reflector 128 is located on a lower surface 140 of the safe 100 on approximately the same horizontal plane as the lower surface 140 of the safe 100. In certain instances, at least one transmitter 122 is located on a lower surface 140 of the safe 100 on approximately the same horizontal plane as the lower surface 140 of the safe 100. In certain instances, at least one receiver 124 is located on a lower surface 140 of the safe 100 on approximately the same horizontal plane as the lower surface 140 of the safe 100. Being located on approximately the same plane (ex. horizontal plane), in certain instances, means that the respective transmitter 122, receiver 124, and/or reflector 128, does, or does not substantially, extend beyond the plane of the respective surface (ex. lower surface 140, sidewall 150, or upper surface 160) in which the component is located. In certain instances, regardless of where the transmitter(s) 122, receiver(s) 124, and/or reflector(s) 128 are located (i.e. lower surface 140, sidewall 150, or upper surface 160), they are in approximately same plane as the surface 140, 150, 160 in which they are located.

The configuration of the transmitter(s) 122, receiver(s) 124, and reflector(s) 128, when included, in certain instances, enable the determination of whether or not the safe contains an item 500. The safe 100, in certain instances, is configured to transmit a notification to at least one of a mobile device 400, and a room management system 300. The notification may indicate whether or not an item 500 is inside the safe 100. The safe 100, room management system 300, mobile device 400, and/or server 500, in certain instances, are in communication with one another. The notification, in certain instances, is transmitted to the room management system 300 and/or mobile device 400 to enable a guest to recover their item 500 from within the safe 100. This communication may, in certain instances, be two-way communication (ex. wireless). The communication between the safe 100, room management system 300, mobile device 400, and/or server 500, in certain instances, is completed using Bluetooth. For example, in certain instances, the safe 100 transmits the notification to the room management system 300 and/or mobile device 400 using Bluetooth. The communication between the safe 100, room management system 300, mobile device 400, and/or server 500, in certain instances, may be completed used any short range wireless communication, such as for example, Wi-Fi, Bluetooth, ZigBee, infrared, or any other short-range wireless communication method known to one of skill in the art. Additionally, the communication between the safe 100, room management system 300, mobile device 400, and/or server 500, in certain instances, may be completed using one or more wired connection. The communication between the mobile device 400 and the safe 100, room management system 400, and/or server 500, in certain instances, is completed through a wireless network (ex. cellular network).

The room management system 300, in certain instances, is capable of storing a checkout time, for example, a checkout time of a guest for a particular hotel room. In certain instances, the room management system 300 is in communication with the server 500 to store the checkout time. The room management system 300, in certain instances, is capable of comparing the current time with the checkout time to determine when the current time is within a selected time period of a checkout time. The selected time period, in certain instances, is one hour prior to the checkout time. The room management system 300, in certain instances, communicates with the safe 100, for example, using Bluetooth, when the current time is within a selected time period of a checkout time. For example, the room management system 300, in certain instances, when the current time period is within a selected time period of a checkout time, sends a communication to the safe 100 to determine whether the safe 100 contains an item 500. To determine whether the safe 100 contains an item 500, as described above, the safe 100 may include one or more transmitter 122, receiver 124, and processor 126. The safe 100, in certain instances, transmits the notification to at least one of the mobile device 400 and the room management system 300 when a current time is within a selected time period of a checkout time. The selected time period, in certain instances, can be selected by the guest and/or hotel staff member. The selected time period, in certain instances, is stored by the room management system 300. In certain instances, the room management system 300 is in communication with the server 500 to store the selected time period. The selected time period may, in certain instances, be stored by the safe 100 and/or communicated to the safe 100 using Bluetooth.

In certain instances, the selected time period is one hour prior to the checkout time. The selected time period may, in certain instances, be between ten minutes and two hours of a checkout time. For example, the selected time period may be between ten minutes and thirty minutes, between ten minutes and one hour, between ten minutes and one and a half hours, between thirty minutes and one hour, between thirty minutes and one and a half hours, between thirty minutes and two hours, between one hour and one and a half hours, between one hour and two hours, between one and a half hours and two hours.

Figure 4:
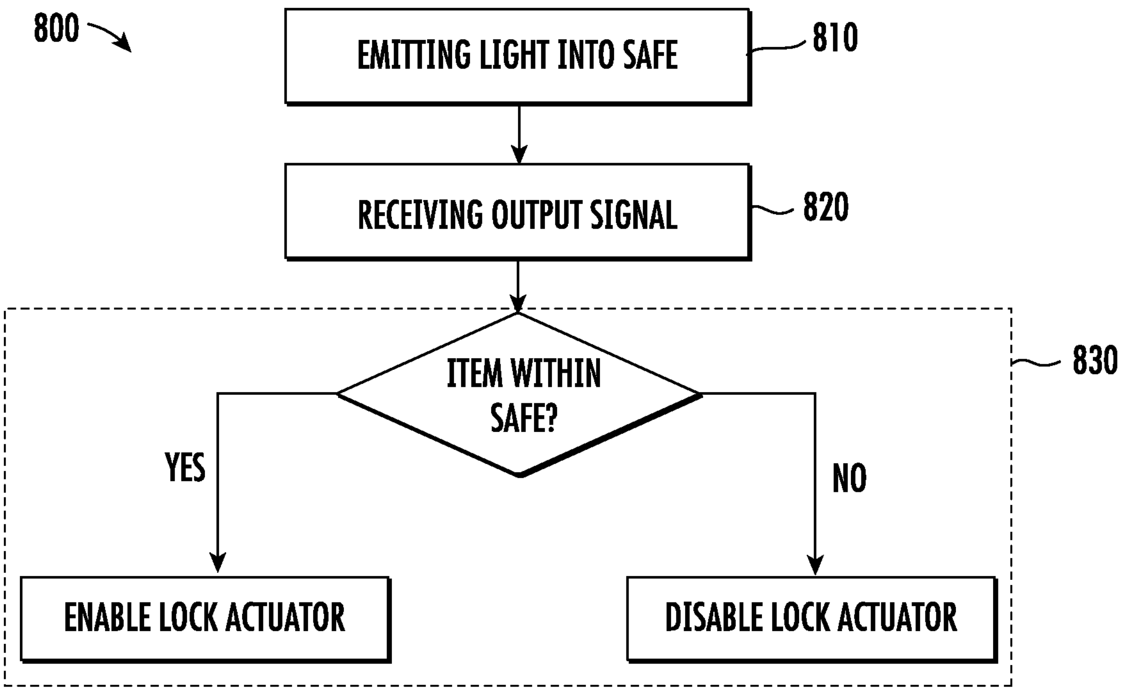
FIG. 4 is a flow diagram illustrating a method for controlling a lock actuator of a safe, in accordance with one aspect of the disclosure.

The configuration and operation of the components of the safe, in certain instances, enable a more efficient method of ensuring the availability of a safe. The method may be completed, for example, using a safe 100 as shown in FIGS. 1-3. Regardless of the particular configuration of the safe, the method provides for the controlling of a lock actuator of a safe. The method 800 of controlling a lock actuator of a safe is illustrated in FIG. 4. As shown in FIG. 4, the method includes step 810 of emitting light into a safe. This light, in certain instances, is an infrared light. The light is, in certain instances, emitted from a transmitter toward a receiver, the receiver configured to receive the light and generate an output signal. The light, in certain instances, is emitted from the transmitter when a user attempts to lock a mechanical or electronic lock of the safe. The light, in certain instances, is emitted from the transmitter just before a selected time period of a checkout time. The method 800 further includes step 820 of receiving the output signal. The output signal is, in certain instances, generated by the receiver and received from the receiver at a processor. The method 800 additionally includes step 830 of determining, in the processor, whether an item is inside the safe. The output signal, in certain instances, indicates no item is inside the safe when the receiver receives the light emitted from the transmitter. When the output signal indicates no item is inside the safe, the method 800 provides for the disabling of the lock actuator from locking a mechanical or electronic lock of the safe. The output signal, in certain instances, indicates an item is inside the safe when the receiver does not receive the light emitted from the transmitter. When the output signal indicates an item is inside the safe, the method 800 provides for the enabling of the lock actuator to lock a mechanical or electronic lock of the safe.

The method 800 may, in certain instances, further provide for a notification to be sent from the safe to at least one of a mobile device and a room management system when the output signal indicates an item is inside the safe. This notification may, in certain instances, be transmitted using Bluetooth. The notification to the mobile device and the room management system, may, in certain instances, be completed when the current time is within the selected time period of a checkout time. The determining of whether a current time is within a selected time period of a checkout time may, in certain instances, be completed by the room management system. As described above, the selected time period may be selected by the guest and/or hotel staff member.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A safe comprising:

a lock actuator configured to lock or unlock a mechanical or electronic lock of the safe;

a control system communicatively connected with the lock actuator, the control system comprising:

a transmitter configured to emit a light into the safe when a user attempts to lock the mechanical or electronic lock of the safe;

a receiver configured to receive the light emitted from the transmitter and generate an output signal, wherein the light is emitted within the safe in such a way that if an item is located within the safe the item blocks the light from being received by the receiver, wherein when the receiver receives the light emitted from the transmitter the output signal indicates no item is inside the safe; and a processor configured to receive the output signal from the receiver and determine whether an item is inside the safe, wherein the processor disables the lock actuator from locking the safe when the output signal indicates no item is inside the safe.

2. The safe of claim 1, wherein when the receiver does not receive the light emitted from the transmitter the output signal indicates an item is inside the safe.

3. The safe of claim 2, wherein the processor enables the lock actuator to lock the safe when the output signal indicates an item is inside the safe.

4. The safe of claim 1, wherein the control system further comprises at least one reflector configured to reflect the light emitted from the transmitter toward the receiver.

5. The safe of claim 4, wherein the at least one reflector is located on a lower surface of the safe on approximately the same horizontal plane as the lower surface of the safe.

6. The safe of claim 1, wherein the safe is configured to transmit a notification to at least one of a mobile device and a room management system.

7. The safe of claim 6, wherein the safe transmits the notification to at least one of the mobile device and the room management system when a current time is within a selected time period of a checkout time.

8. The safe of claim 7, wherein the selected time period is one hour prior to the checkout time.

9. A method for controlling a lock actuator of a safe, the method comprising:

emitting, from a transmitter, a light into a safe toward a receiver when a user attempts to lock a mechanical or electronic lock of the safe, the receiver configured to receive the light and generate an output signal, wherein the light is emitted within the safe in such a way that if an item is located within the safe the item blocks the light from being received by the receiver;

receiving, from the receiver at a processor, the output signal generated by the receiver, wherein when the receiver receives the light emitted from the transmitter the output signal indicates no item is inside the safe; and determining, in the processor, whether an item is inside the safe, wherein the processor disables the lock actuator from locking the safe when the output signal indicates no item is inside the safe.

10. The method of claim 9, wherein the output signal indicates an item is inside the safe when the receiver does not receive the light emitted from the transmitter.

11. The method of claim 10, wherein the lock actuator is enabled to lock a mechanical or electronic lock of the safe when the output signal indicates an item is inside the safe.

12. The method of claim 9, further comprising determining, in a room management system, whether a current time is within a selected time period of a checkout time.

13. The method of claim 12, further comprising transmitting a notification from the safe to at least one of a mobile device and the room management system when the output signal indicates an item is inside the safe and the current time is within the selected time period of the checkout time.

14. The method of claim 13, wherein the selected time period is one hour prior to the checkout time.

* * * * *